US 9,404,550 B2

United States Patent
Sakuta

(10) Patent No.: US 9,404,550 B2
(45) Date of Patent: Aug. 2, 2016

(54) ROTARY DAMPER

(71) Applicant: KAYABA INDUSTRY CO., LTD., Tokyo (JP)

(72) Inventor: Atsushi Sakuta, Gifu (JP)

(73) Assignee: KYB Corporation, Tokyo (JP)

( * ) Notice: Subject to any disclaimer, the term of this patent is extended or adjusted under 35 U.S.C. 154(b) by 23 days.

(21) Appl. No.: 14/383,100

(22) PCT Filed: Mar. 1, 2013

(86) PCT No.: PCT/JP2013/055633
§ 371 (c)(1),
(2) Date: Sep. 4, 2014

(87) PCT Pub. No.: WO2013/133150
PCT Pub. Date: Sep. 12, 2013

(65) Prior Publication Data
US 2015/0008082 A1    Jan. 8, 2015

(30) Foreign Application Priority Data

Mar. 5, 2012   (JP) .................................. 2012-047678

(51) Int. Cl.
F16F 9/12    (2006.01)
F16F 9/52    (2006.01)
F16F 9/14    (2006.01)
F16F 9/34    (2006.01)

(52) U.S. Cl.
CPC . *F16F 9/12* (2013.01); *F16F 9/145* (2013.01); *F16F 9/34* (2013.01); *F16F 9/52* (2013.01)

(58) Field of Classification Search
CPC .............. F16F 9/12; F16F 9/145; F16F 9/34; F16F 9/52
See application file for complete search history.

(56) References Cited

U.S. PATENT DOCUMENTS

| 2,997,140 | A | * | 8/1961 | Rumsey | .................. | F16F 9/145 |
| | | | | | | 188/278 |
| 4,286,621 | A | | 9/1981 | Glahn | | |
| 2003/0111308 | A1 | * | 6/2003 | VanValkenburgh | .... | B62K 21/08 |
| | | | | | | 188/290 |
| 2005/0252740 | A1 | * | 11/2005 | Fukukawa | .............. | F16F 9/145 |
| | | | | | | 188/290 |
| 2005/0263360 | A1 | | 12/2005 | Forster | | |
| 2009/0159382 | A1 | | 6/2009 | Chemouni et al. | | |
| 2012/0252590 | A1 | * | 10/2012 | Yonezawa | .............. | F16F 9/145 |
| | | | | | | 464/180 |

FOREIGN PATENT DOCUMENTS

| EP | 2175159 A2 | 4/2010 |
| JP | S56-86270 A | 7/1981 |
| JP | S64-12152 A | 1/1989 |
| JP | S64-17045 U | 1/1989 |
| JP | H02-102035 U | 8/1990 |
| JP | H02-102036 U | 8/1990 |
| JP | H11-82593 A | 3/1999 |
| JP | H11-101293 A | 4/1999 |
| JP | H11-344066 A | 12/1999 |

* cited by examiner

Primary Examiner — Vishal Sahni
(74) Attorney, Agent, or Firm — Rabin & Berdo, P.C.

(57) ABSTRACT

A rotary damper includes: a shaft capable of rotating about a central axis; a pair of side panels that support the shaft rotatably; a case provided between the pair of side panels such that an operating chamber is defined in an interior thereof; a vane provided on the shaft such that a tip end thereof slides against an inner periphery of the case, thereby dividing the operating chamber into a first chamber and a second chamber; and a damping valve provided in the shaft to apply resistance to a flow of a fluid traveling between the first chamber and the second chamber.

9 Claims, 2 Drawing Sheets

ROTARY DAMPER

TECHNICAL FIELD

The present invention relates to an improvement in a rotary damper.

BACKGROUND ART

A rotary damper used in the related art includes a shaft, a pair of side panels that support the shaft rotatably, a case that is sandwiched between the pair of side panels such that an operating chamber is defined in an interior thereof, and a vane provided on the shaft so as to divide the operating chamber into a first chamber and a second chamber.

JP11-82593A and JP11-344066A, for example, disclose rotary dampers that operate when an external rotary force is exerted on the shaft, whereby the vane moves within the operating chamber in response to the rotation of the shaft, causing the first chamber to contract and the second chamber to expand. In these rotary dampers, a damping valve applies resistance to a flow of oil moving from the contracting first chamber to the expanding second chamber, and as a result, the rotation of the shaft is damped.

SUMMARY OF INVENTION

As described above, this type of rotary damper includes a damping valve that generates a damping force. In the rotary damper of JP11-82593A, two damping valves are disposed side by side in a lateral direction on a side of a case forming an operating chamber. In the rotary damper of JP11-344066A, two through holes are provided in a partition wall portion that partitions an operating chamber formed in a disc-shaped case, and corresponding damping valves are housed respectively in the through holes.

Since, in the rotary damper of JP11-82593A, the damping valves are provided on the side of the case, the rotary damper is large. Accordingly, a weight of the rotary damper increases, and as a result, it may be difficult to install the rotary damper in a damping subject such as a vehicle.

Further, in the rotary damper of JP11-344066A, the damping valves are provided in the partition wall portion partitioning the operating chamber in the case, and therefore a swingable range of the shaft is reduced. To secure a sufficient swingable range for the shaft, an outer diameter of the case must be increased, and therefore the rotary damper increases in size, similarly to the rotary damper of JP11-82593A. Hence, the weight of the rotary damper increases, and as a result, it may be difficult to install the rotary damper in a damping subject such as a vehicle.

The present invention has been designed in consideration of the problems described above, and an object thereof is to provide a small and lightweight rotary damper.

According to one aspect of this invention, a rotary damper includes a shaft capable of rotating about a central axis, a pair of side panels that support the shaft rotatably, a case provided between the pair of side panels such that an operating chamber is defined in an interior thereof, a vane provided on the shaft such that a tip end thereof slides against an inner periphery of the case, thereby dividing the operating chamber into a first chamber and a second chamber, and a damping valve provided in the shaft to apply resistance to a flow of a fluid traveling between the first chamber and the second chamber.

The details as well as other features and advantages of this invention are set forth in the remainder of the specification and are shown in the accompanying drawings.

DESCRIPTION OF EMBODIMENTS

A rotary damper D according to an embodiment of the present invention will be described below with reference to the figures.

Figure 1:
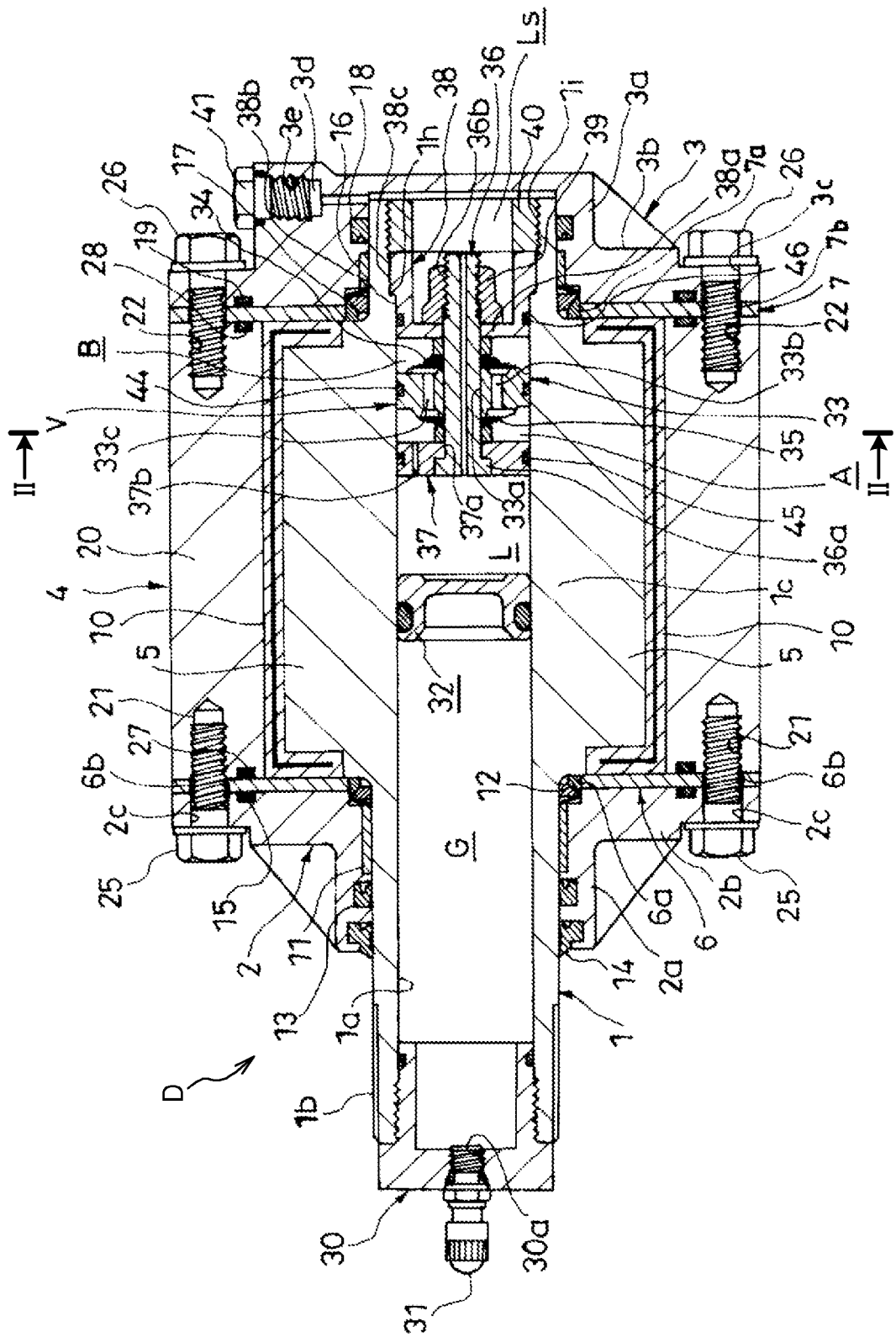
FIG. 1 is a longitudinal sectional view of a rotary damper according to an embodiment of the present invention.
Figure 2:
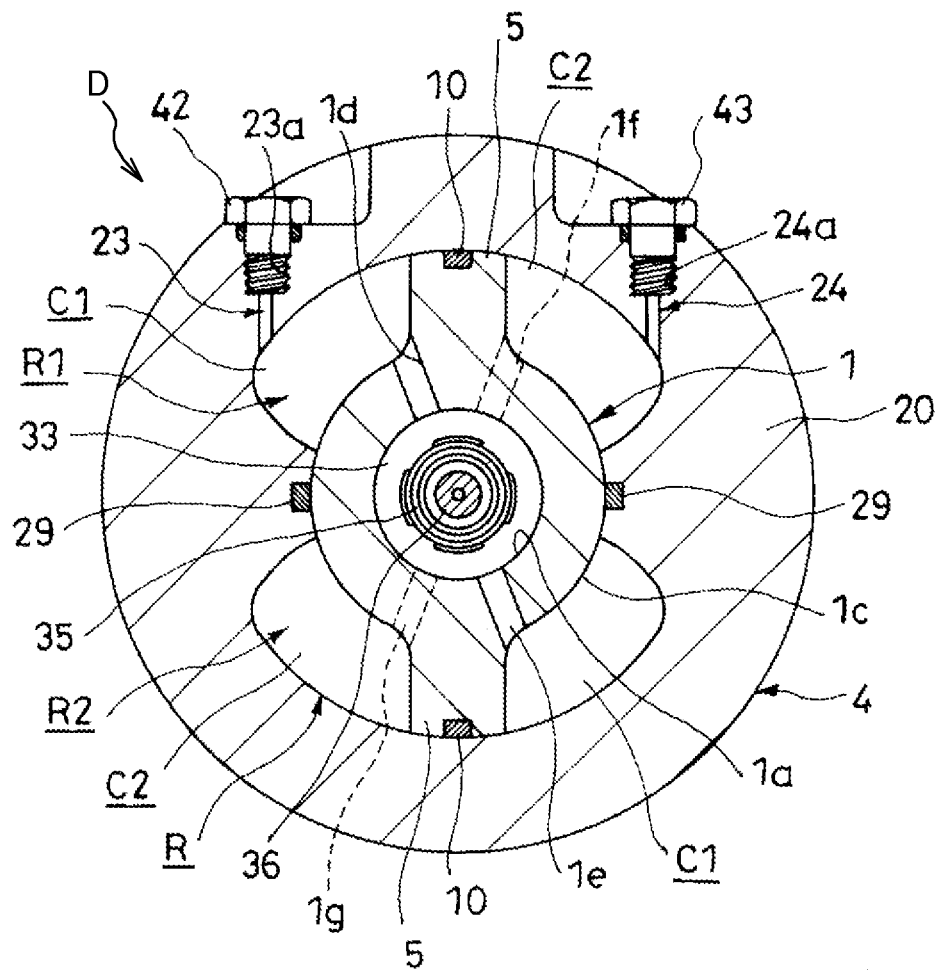
FIG. 2 is a II-II sectional view of FIG. 1.

As shown in FIGS. 1 and 2, the rotary damper D includes a shaft 1 capable of rotating about a central axis, a pair of side panels 2, 3 that support the shaft rotatably, a tubular case 4 provided between the pair of side panels 2, 3 such that an operating chamber R is defined in an interior thereof, vanes 5 provided on the shaft 1 such that respective tip ends thereof slide against an inner periphery of the case 4, thereby dividing the operating chamber R into a first chamber R1 and a second chamber R2, and a damping valve V provided in the shaft 1 to apply resistance to a flow of a fluid that travels between the first chamber R1 and the second chamber R2. When the shaft 1 is rotated in a circumferential direction relative to the case 4, the rotary damper D generates a damping force for damping the rotation of the shaft 1.

The shaft 1 is formed in a tubular shape having a hollow portion 1a in an interior thereof. The shaft 1 includes a serration 1b provided on a tip end outer periphery to enable the shaft 1 to be connected to a joint or the like (not shown), an enlarged diameter portion 1c formed with a larger outer diameter than other parts, the pair of vanes 5 formed on an outer periphery of the enlarged diameter portion 1c at intervals of 180 degrees in the circumferential direction, and four through holes 1d, 1e, 1f, 1g opened in side portions of the enlarged diameter portion 1c between the pair of vanes 5 so as to communicate with the hollow portion 1a.

The serration 1b is provided on the shaft 1 to enable connection to a joint or the like not shown in the figures, but the shaft 1 may be connected using another method. A step portion 1h is provided midway on a first end side (a right side in FIG. 1) of the shaft 1 such that an inner diameter of the hollow portion 1a is enlarged. A screw portion 1i is provided on an inner periphery of the hollow portion 1a at the first end of the shaft 1. A closed end cylinder-shaped cap 30 is screwed to a second end (a left end in FIG. 1) of the shaft 1.

The cap 30 closes the second end of the shaft 1. The cap 30 includes a screw hole 30a that penetrates a bottom portion thereof. A valve 31 is screwed into the screw hole 30a. A sliding partition wall 32 is inserted slidably into the hollow portion 1a.

The sliding partition wall 32 defines a gas chamber G in the hollow portion 1a on the second end side (the left side in FIG. 1) of the sliding partition wall 32. As the sliding partition wall 32 moves through the hollow portion 1a in an axial direction (a left-right direction in FIG. 1), a volume of the gas chamber G increases and decreases. A gas can be charged into the gas chamber G from the outside via the valve 31.

The damping valve V is housed in the hollow portion 1a on the first end side (the right side in FIG. 1) of the sliding partition wall 32. The damping valve V includes a partition wall member 33 that is inserted into the hollow portion 1a so as to define a first side valve chamber A that communicates with the first chamber R1 and a second side valve chamber B that communicates with the second chamber R2 within the hollow portion 1a, a first side leaf valve 34 serving as a first side valve body provided on the second side valve chamber B side of the partition wall member 33, a second side leaf valve 35 serving as a second side valve body provided on the first side valve chamber A side of the partition wall member 33, and a rod 36 that integrates the partition wall member 33, the first side leaf valve 34, and the second side leaf valve 35.

A partitioning member 37 that is fitted to an inner periphery of the hollow portion 1a and a holder member 38 for fixing the damping valve V in a predetermined position within the hollow portion 1a are attached to the rod 36.

The second end side (the left side in FIG. 1) of the partitioning member 37 in the hollow portion 1a is divided into a liquid chamber L and the gas chamber G by the sliding partition wall 32. The partition wall member 33 is disposed between the partitioning member 37 and the holder member 38. The first side valve chamber A and the second side valve chamber B are defined by the partition wall member 33. In the hollow portion 1a, the first side valve chamber A is formed between the partitioning member 37 and the partition wall member 33, and the second side valve chamber B is formed between the partition wall member 33 and the holder member 38. The first side valve chamber A communicates with the first chamber R1 through the through holes 1d, 1e. The second side valve chamber B communicates with the second chamber R2 through the through holes 1f, 1g.

The partition wall member 33 is formed in a disc shape. The partition wall member 33 includes an insertion hole 33a through which the rod 36 is inserted, and a first side port 33b and a second side port 33c that connect the first side valve chamber A to the second side valve chamber B. A seal ring 44 is attached to an outer periphery of the partition wall member 33 and fitted tightly to the inner periphery of the hollow portion 1a to prevent the first side valve chamber A and the second side valve chamber B from communicating via the outer periphery of the partition wall member 33.

The annular second side leaf valve 35 is provided in laminated fashion on the first side valve chamber A side of the partition wall member 33. The second side leaf valve 35 is attached to the outer periphery of the rod 36 so as to close an opening on the second end side (the left side in FIG. 1) of the second side port 33c.

An inner periphery of the second side leaf valve 35 is fixed to the outer periphery of the rod 36 such that deflection of an outer periphery thereof is permitted. When a pressure in the second side valve chamber B exceeds a pressure in the first side valve chamber A such that a differential pressure between the two reaches a valve opening pressure, the second side leaf valve 35 deflects, thereby opening the second side port 33c so that fluid can pass through while applying resistance to a flow of the fluid. When the pressure in the second side valve chamber B falls below the pressure in the first side valve chamber A, the second side leaf valve 35 is pressed against the partition wall member 33 so as to close the second side port 33c. Hence, the second side port 33c is a one-way port that allows the fluid to flow only from the second side valve chamber B toward the first side valve chamber A in accordance with the second side leaf valve 35.

The annular first side leaf valve 34 is provided in laminated fashion on the second side valve chamber B side of the partition wall member 33. The first side leaf valve 34 is attached to the outer periphery of the rod 36 so as to close an opening on the first end side (the right side in FIG. 1) of the first side port 33b.

An inner periphery of the first side leaf valve 34 is fixed to the outer periphery of the rod 36 such that deflection of an outer periphery thereof is permitted. When the pressure in the first side valve chamber A exceeds the pressure in the second side valve chamber B such that the differential pressure between the two reaches the valve opening pressure, the first side leaf valve 34 deflects, thereby opening the first side port 33b so that fluid can pass through while applying resistance to a flow of the fluid. When the pressure in the first side valve chamber A falls below the pressure in the second side valve chamber B, the first side leaf valve 34 is pressed against the partition wall member 33 so as to close the first side port 33b. Hence, the first side port 33b is a one-way port that allows the fluid to flow only from the first side valve chamber A toward the second side valve chamber B in accordance with the first side leaf valve 34.

It should be noted that the first side leaf valve 34 and the second side leaf valve 35 are both laminated leaf valves constructed by laminating a plurality of annular plates. The number of annular plates is arbitrary, and depending on a desired damping characteristic of the rotary damper D, the first side leaf valve 34 and second side leaf valve 35 may be constructed using only one annular plate.

Further, the first side valve body and the second side valve body may be valve bodies other than leaf valves. For example, valve bodies such as poppet valves or needle valves may be used. Furthermore, the damping valve V may be a valve that does not require a valve body, such as an orifice or a choke. By forming the first side valve body and the second side valve body from the leaf valves 34, 35, however, an overall length of the damping valve V can be shortened in comparison with a case where valve bodies such as poppet valves or needle valves are used. Moreover, by modifying a plate thickness or the number of the laminated annular plates constituting the leaf valves 34, 35, the damping characteristic of the rotary damper D can be tuned easily.

The partitioning member 37 is formed in a disc shape. The partitioning member 37 includes an insertion hole 37a through which the rod 36 is inserted, and an orifice passage 37b that connects the first side valve chamber A to the liquid chamber L. A seal ring 45 is attached to an outer periphery of the partitioning member 37 and fitted tightly to the inner periphery of the hollow portion 1a to prevent the first side valve chamber A and the liquid chamber L from communicating via the outer periphery of the partitioning member 37.

The holder member 38 is formed in an annular shape. The holder member 38 includes an annular portion 38a attached to the outer periphery of the rod 36, a fitting portion 38b provided on an outer periphery of the annular portion 38a and fitted to the inner periphery of the hollow portion 1a, and a large diameter portion 38c provided on an outer periphery of the fitting portion 38b. A seal ring 46 is attached to the outer periphery of the fitting portion 38b of the holder member 38 to prevent the second side valve chamber B and the first end side (the right side in FIG. 1) of the holder member 38 in the hollow portion 1a from communicating via the outer periphery of the holder member 38. An outer diameter of the fitting portion 38b is set at a diameter enabling the fitting portion 38b to be fitted to the inner periphery of the small diameter side of the hollow portion 1a. An outer diameter of the large diameter portion 38c is set at a diameter enabling the large diameter portion 38c to be fitted to the inner periphery of the large diameter side of the hollow portion 1a.

The rod 36 is formed in a tubular shape having a flange 36a on a base end thereof. A screw portion 36b is provided on a tip end outer periphery of the rod 36. The partitioning member 37, the second side leaf valve 35, the partition wall member 33, the first side leaf valve 34, and the holder member 38 are fitted to the outer periphery of the rod 36. When a valve nut 39 is screwed to the screw portion 36b on the tip end of the rod 36, the respective members fitted to the outer periphery of the rod 36 are sandwiched between the flange 36a and the valve nut 39 and thereby fixed integrally to the rod 36.

Hence, the constituent members of the damping valve V are fixed to the rod 36 to form an assembly. The base end of the rod 36 is then inserted into the hollow portion 1a from the first end side (the right side in FIG. 1) of the hollow portion 1a and pressed into the hollow portion 1a until the second end (the left end in FIG. 1) of the large diameter portion 38c of the holder member 38 contacts the step portion 1h of the hollow portion 1a. Once the damping valve V assembly has been housed in the hollow portion 1a in this manner, an outer peripheral screw nut 40 is screwed to the screw portion 1i provided on the right end of the hollow portion 1a, whereby the large diameter portion 38c of the holder member 38 is sandwiched between the outer peripheral screw nut 40 and the step portion 1h. As a result, the holder member 38 is fixed to the shaft 1.

When the holder member 38 is fixed to the shaft 1, the holder member 38 holds the rod 36. As a result, the constituent members of the damping valve V and the partitioning member 37 are fixed to the shaft 1. It should be noted that the shape of the holder member 38 is not limited to the shape described above, and as long as the holder member 38 can be fixed to the inner periphery of the hollow portion 1a of the shaft 1, another shape may be used. Further, the rod 36 is tubular, and therefore the liquid chamber L communicates with a space in the hollow portion 1a on the right of the holder member 38 via an interior of the rod 36.

The side panel 2 is attached to the case 4 via a disc-shaped plate 6 so as to close the second end (the left end in FIG. 1) of the case 4. The side panel 2 includes a shaft holding portion 2a formed in a tubular shape and penetrated by the second end side (the left side in FIG. 1) of the shaft 1, a flange portion 2b provided on an outer periphery of the first end (the right end in FIG. 1) of the shaft holding portion 2a, and a plurality of bolt insertion holes 2c provided in the flange portion 2b at intervals on an identical circumference. A tubular bearing 11 that slides against the outer periphery of the second end side (the left side in FIG. 1) of the shaft 1 is attached to an inner periphery of the shaft holding portion 2a. Annular U packing 13 that slides against the outer periphery of the shaft 1 and an annular dust seal 14 are attached respectively to the inner periphery of the shaft holding portion 2a on the second end side (the left side in FIG. 1) of the bearing 11.

The U packing 13 is fitted tightly to the outer periphery of the shaft 1 so as to form a seal between the shaft 1 and the side panel 2. The dust seal 14 prevents dirt and dust from the outside from entering between the shaft 1 and the side panel 2. An O ring 15 is attached to the case 4 side of the flange portion 2b. The O ring 15 is tightly fitted to the plate 6 to form a seal between the side panel 2 and the plate 6.

The side panel 3 is attached to the case 4 via a disc-shaped plate 7 so as to close the first end (the right end in FIG. 1) of the case 4. The side panel 3 includes a recessed shaft holding portion 3a into which the first end (the right end in FIG. 1) of the shaft 1 is inserted, a flange portion 3b provided on an outer periphery of the second end side (the left side in FIG. 1) of the shaft holding portion 3a, a plurality of bolt insertion holes 3c provided in the flange portion 3b at intervals on an identical circumference, and a panel side injection port 3d opened in an outer periphery so as to communicate with an interior of the shaft holding portion 3a. Further, a plug 41 that closes the panel side injection port 3d is screwed to an open end 3e of the panel side injection port 3d that opens onto the outer periphery of the side panel 3.

The side panel 3 closes an open end on the first end (the right end in FIG. 1) of the shaft 1. The side panel 3 closes a space in the hollow portion 1a on the first end side (the right side in FIG. 1) of the holder member 38. This space communicates with the liquid chamber L via the interior of the rod 36. When closed by the side panel 3, this space functions as an auxiliary liquid chamber Ls.

The auxiliary liquid chamber Ls communicates with the outside of the rotary damper D via the panel side injection port 3d. By injecting fluid from the outside of the rotary damper D using the panel side injection port 3d, the fluid can be charged into respective interiors of the auxiliary liquid chamber Ls and the liquid chamber L communicating therewith. It should be noted that since the orifice passage 37b is provided in the partitioning member 37, fluid can be charged into the first side valve chamber A through the orifice passage 37b. Furthermore, fluid can be charged into the second side valve chamber B through the first side port 33b.

A tubular bearing 16 that slides against the outer periphery of the first end side (the right side in FIG. 1) of the shaft 1 is attached to an inner periphery of the shaft holding portion 3a. Annular U packing 18 that slides against the outer periphery of the shaft 1 is attached to the inner periphery of the shaft holding portion 3a on the first end side (the right side in FIG. 1) of the bearing 16. Since the shaft holding portion 3a is not open to the outside, the side panel 3 is not provided with a dust seal. However, in a case where the second end of the shaft 1 projects to the outside such that the shaft holding portion 3a is open to the outside, a dust seal may be provided.

An O ring 19 is attached to the case 4 side of the side panel 3. The O ring 19 forms a seal between the side panel 3 and the plate 7. The side panels 2, 3 are formed from a lightweight material such as aluminum, for example. Hence, an overall weight of the rotary damper D is reduced.

The plates 6, 7 are formed in a disc shape to be thinner than the side panels 2, 3. The plates 6, 7 respectively include shaft insertion holes 6a, 7a formed centrally and penetrated by the shaft 1, and pluralities of bolt insertion holes 6b, 7b provided in positions aligning with the respective bolt insertion holes 2c, 3c formed in the side panels 2, 3. The plates 6, 7 are provided to slide against the vanes 5, thereby protecting the side panels 2, 3.

To secure wear resistance in the plates 6, 7, respective vane 5 side surfaces of the plates 6, 7 are preferably formed from a material exhibiting superior wear resistance. More specifically, for example, the plates 6, 7 may be formed entirely from a material having high hardness. Further, the wear resistance of the respective surfaces (sliding surfaces) of the plates 6, 7 that contact the vanes 5 may be increased by forming plating or a diamond-like carbon film on the surfaces or implementing gas nitrocarburizing processing, thermal processing, or silicon attachment processing on the surfaces. It should be noted that the plates 6, 7 may be omitted, and instead, the side panels 2, 3 may be attached directly to the case 4.

The case 4 includes a main body 20 formed in a tubular shape such that the operating chamber R is defined in the interior thereof, a plurality of screw holes 21 provided in the second end side (the left side in FIG. 1) of the main body 20 in alignment with the respective bolt insertion holes 2c of the side panel 2, a plurality of screw holes 22 provided in the first end side (the right side in FIG. 1) of the main body 20 in alignment with the respective bolt insertion holes 3c of the side panel 3, and case side injection ports 23, 24 connecting an interior of the main body 20 to the outside.

The plate 6 and the side panel 2 are attached in that order to the second end side of the case 4. The plate 6 and the side panel 2 are integrated with the case 4 by screwing bolts 25 inserted into the bolt insertion holes 2c, 6b to the screw holes 21. The plate 7 and the side panel 3 are attached in that order to the first end side of the case 4. The plate 7 and the side panel 3 are integrated with the case 4 by screwing bolts 26 inserted into the bolt insertion holes 3c, 7b to the screw holes 22. The bolts 25, 26 may be used in numbers required to secure sufficient strength. The bolt insertion holes 2c, 3c, 6b, 7b and the screw holes 21, 22 are therefore provided in accordance with the numbers of the bolts 25, 26 required to secure sufficient strength.

When the shaft 1 is inserted into the case 4 and the plates 6, 7 and the side panels 2, 3 are attached to the case 4 in the manner described above, the interior of the case 4 is airtight. At this time, two fan-shaped operating chambers R are formed in the case 4. The tip ends of the vanes 5 slide against the inner periphery of the case 4. The two operating chambers R are each divided into a chamber C1 and a chamber C2 by the vanes 5. A fluid such as working oil, for example, is sealed into the chambers C1 and the chambers C2. O rings 27, 28 surrounding respective outer peripheries of the operating chambers R are attached to the respective ends (the left and right ends in FIG. 1) of the main body 20 of the case 4. The O rings 27, 28 form seals between the case 4 and the plates 6, 7. As a result, the operating chambers R are airtight.

The chambers C1 are defined on the first end side (an upper left side and a lower right side in FIG. 2) of the pair of vanes 5, while the chambers C2 are defined on the second end side (an upper right side and a lower left side in FIG. 2) of the vanes 5. When the shaft 1 rotates clockwise in FIG. 2, the chambers C1 are caused to expand and the chambers C2 are caused to contract by the vanes 5. When the shaft 1 rotates counterclockwise in FIG. 2, on the other hand, the chambers C1 are caused to contract and the chambers C2 are caused to expand by the vanes 5.

The chambers C1 that are caused to expand or contract in volume as the shaft 1 rotates communicate with each other via the through holes 1d, 1e in the shaft 1 and the first side valve chamber A to form the first chamber R1. Similarly, the chambers C2 that are caused to expand or contract in volume as the shaft 1 rotates communicate with each other via the through holes 1f, 1g in the shaft 1 and the second side valve chamber B to form the second chamber R2. The first chamber R1 and the second chamber R2 are defined by the vanes 5. The through holes 1d, 1e are opened in respective bases of the vanes 5 so that the chambers C1 are maintained in a communicative condition with each other even when the shaft 1 rotates. The through holes 1f, 1g are likewise opened in respective bases of the vanes 5 so that the chambers C2 are maintained in a communicative condition with each other even when the shaft 1 rotates.

The vanes 5 each have an arc-shaped surface on a tip end thereof. A U-shaped seal 10 is attached to each vane 5 from the second end (the left end in FIG. 1) on the side panel 2 side to the first end (the right end in FIG. 1) on the tip end and side panel 3 side. The seals 10 slide against an inner peripheral surface of the case 4 and end surfaces of the plates 6, 7 so as to form seals between the vanes 5 and the case 4 and between the vanes 5 and the plates 6, 7.

Further, a U-shaped seal 29 is attached to the inner periphery of the main body 20 from a part that slides against the outer periphery of the enlarged diameter portion 1c of the shaft 1 to the respective ends (the left and right ends in FIG. 1) of the main body 20. A side seal 12 that slides against both a side wall of the shaft insertion hole 6a and the enlarged diameter portion 1c of the shaft 1 so as to form a seal between the plate 6 and the shaft 1 is provided on an inner periphery of the plate 6. A side seal 17 that slides against both a side wall of the shaft insertion hole 7a and the enlarged diameter portion 1c of the shaft 1 so as to form a seal between the plate 7 and the shaft 1 is provided on an inner periphery of the plate 7. The first chamber R1 and the second chamber R2 are sealed so as not to communicate with each other via the damping valve V by the seal 29, the seal 10, the side seals 12, 17, and the O rings 27, 28.

The case side injection port 23 communicates with the chambers C1 so that the fluid can be injected into the first chamber R1 from the outside of the case 4. A plug 42 that closes the case side injection port 23 is screwed to an open end 23a of the case side injection port 23 that opens onto the outer periphery of the case 4. The case side injection port 24 communicates with the chambers C2 so that the fluid can be injected into the second chamber R2 from the outside of the case 4. A plug 43 that closes the case side injection port 24 is screwed to an open end 24a of the case side injection port 24 that opens onto the outer periphery of the case 4.

The open ends 23a, 24a of the case side injection ports 23, 24 and the open end 3e of the panel side injection port 3d are all disposed so as to be oriented upward when the rotary damper D is disposed on its side such that the shaft 1 is horizontal, as shown in FIG. 1. In other words, when the rotary damper D is disposed on its side, respective upper ends of the open ends 23a, 24a, and 3e can be disposed further upward than an upper end of the operating chamber R. Hence, by injecting the fluid into the rotary damper D through the case side injection ports 23, 24 and the panel side injection port 3d and then closing the ports 23, 24, and 3d using the plugs 41, 42, and 43, the fluid can be injected easily into the first chamber R1, the second chamber R2, the first side valve chamber A, the second side valve chamber B, the liquid chamber L, and the auxiliary liquid chamber Ls of the rotary damper D without intermixing with gas. Furthermore, the fluid can be discharged similarly through the case side injection ports 23, 24 and the panel side injection port 3d, and therefore fluid replacement is also easy.

The first side valve chamber A and the first chamber R1 communicate via the through holes 1d, 1e. The second side valve chamber B and the second chamber R2 communicate via the through holes 1f, 1g. The first side valve chamber A and the second side valve chamber B communicate via the first side port 33b and the second side port 33c. The first side valve chamber A and the liquid chamber L communicate via the orifice passage 37b. The liquid chamber L and the auxiliary liquid chamber Ls communicate via the interior of the rod 36. Therefore, the fluid can be injected into the rotary damper D as long as any one of the case side injection ports 23, 24 and the panel side injection port 3d is provided.

However, the leaf valves 34, 35 are provided respectively in the first side port 33b and the second side port 33c, and therefore it takes time for the fluid to move from the first side valve chamber A into the second side valve chamber B or from the second side valve chamber B into the first side valve chamber A. Moreover, the fluid must pass through the orifice passage 37b to move from the liquid chamber L into the first side valve chamber A or from the first side valve chamber A into the liquid chamber L, and therefore it takes time for the fluid to pass. Hence, by providing all of the case side injection ports 23, 24 and the panel side injection port 3d and injecting the fluid therein, a fluid injection operation time can be shortened. Further, gas retention in the first chamber R1, the second chamber R2, the first side valve chamber A, the second side valve chamber B, the liquid chamber L, and the auxiliary liquid chamber Ls can be prevented reliably.

An operation of the rotary damper D will now be described.

When the shaft 1 rotates counterclockwise in FIG. 2 such that the vanes 5 cause the first chamber R1 to contract, the pressure in the first chamber R1 increases, causing the first side leaf valve 34 to deflect such that the first side port 33b opens. Accordingly, the fluid pushed out of the first chamber R1 flows into the second chamber R2 through the first side valve chamber A, the first side port 33*b*, and the second side valve chamber B. As the fluid passes through the first side port 33*b*, resistance is applied to the flow of the fluid by the first side leaf valve 34 such that a difference in pressure arises between the first chamber R1 and the second chamber R2. As a result, the rotary damper D generates a damping force for damping the rotation of the shaft 1.

When, on the other hand, the shaft 1 rotates clockwise in FIG. 2 such that the vanes 5 cause the second chamber R2 to contract, the pressure in the second chamber R2 increases, causing the second side leaf valve 35 to deflect such that the second side port 33*c* opens. Accordingly, the fluid pushed out of the second chamber R2 flows into the first chamber R1 through the second side valve chamber B, the second side port 33*c*, and the first side valve chamber A. As the fluid passes through the second side port 33*c*, resistance is applied to the flow of the fluid by the second side leaf valve 35 such that a difference in pressure arises between the second chamber R2 and the first chamber R1. As a result, the rotary damper D generates a damping force for damping the rotation of the shaft 1.

Further, when a volume of the fluid varies due to temperature variation in the fluid in the rotary damper D, the sliding partition wall 32 moves in the axial direction through the hollow portion 1*a*, thereby increasing or reducing a capacity of the gas chamber G. As a result, the volume variation in the fluid is compensated for. In this case, a compensation mechanism is constituted by the sliding partition wall 32 inserted into the hollow portion 1*a* to be free to slide, and the gas chamber G and liquid chamber L defined by the sliding partition wall 32.

More specifically, when volume variation occurs in the fluid, the amount of fluid in the first chamber R1, the second chamber R2, the first side valve chamber A, and the second side valve chamber B becomes either excessive or insufficient in accordance with the volume variation. Therefore, the sliding partition wall 32 moves through the hollow portion 1*a* by an amount corresponding to the volume variation. Hence, when the fluid is excessive, the excess fluid is discharged into the liquid chamber L from the first chamber R1, the second chamber R2, the first side valve chamber A, and the second side valve chamber B, and when the fluid is insufficient, an amount of fluid covering the deficiency is supplied to the first chamber R1, the second chamber R2, the first side valve chamber A, and the second side valve chamber B from the liquid chamber L. A pressure in the gas chamber G propagates to the first chamber R1, the second chamber R2, the first side valve chamber A, and the second side valve chamber B via the liquid chamber L. Therefore, by increasing the pressure in the gas chamber G, an apparent stiffness of the fluid increases, and as a result, the rotary damper D can generate the damping force with favorable responsiveness.

The first side leaf valve 34 and the second side leaf valve 35 are set such that when a flow rate remains constant, the resistance applied to the flow of the fluid by the second side leaf valve 35 is larger than the resistance applied to the flow of the fluid by the first side leaf valve 34. In other words, the rotary damper D is set such that when an absolute value of a rotation speed of the shaft 1 remains constant, the damping force generated as the vanes 5 cause the second chamber R2 to contract is larger than the damping force generated as the vanes 5 cause the first chamber R1 to contract. Hence, in the rotary damper D, comparing the pressure in the first chamber R1 when the first chamber R1 contracts with the pressure in the second chamber R2 when the second chamber R2 contracts, the pressure in the second chamber R2 is more likely to be higher than the pressure in the first chamber R1, while the pressure in the first chamber R1 is more likely to be lower than the pressure in the second chamber R2.

Therefore, when the damping force generated by the rotary damper D is set to be different depending on the rotation direction of the shaft 1, as described above, the liquid chamber L is connected to the first chamber R1, which is more likely to decrease in pressure, via the first side damper chamber A. As a result, the pressure in the second chamber R2 does not escape into the liquid chamber L when the second chamber R2, which is more likely to increase in pressure, contracts. Hence, when the second chamber R2 contracts, a situation in which the pressure in the second chamber R2 escapes such that an expected damping force cannot be generated does not occur even in a condition where the rotary damper D is required to generate a large damping force.

When the rotary damper D is incorporated into a suspension of a vehicle in order to damp a relative motion in which a vehicle body and an axle of the vehicle separate from and approach each other using a damping force, the rotary damper D is typically required to generate a larger damping force when the vehicle body and the axle separate from each other than when the vehicle body and the axle approach each other. Therefore, by attaching the rotary damper D such that the second chamber R2 contracts when the vehicle body and the axle separate from each other and the first chamber R1 contracts when the vehicle body and the axle approach each other, the rotary damper D can generate the required damping force without the pressure in the second chamber R2 escaping into the liquid chamber L. Hence, the rotary damper D is optimal for application to a suspension of a vehicle.

As described above, the rotary damper D generates the damping force for damping the rotation of the shaft 1 as the shaft 1 rotates. In the rotary damper D, the damping valve V is provided in the shaft 1 to apply resistance to the flow of the fluid traveling between the first chamber R1 and the second chamber R2. Hence, there is no need to provide the damping valve V on the side of the case 4 or in a location that affects a swingable range of the shaft 1, and therefore the rotary damper D can be reduced in size and weight.

Further, the damping valve V is conventionally provided in the interior of the shaft 1, which is dead space, and therefore the outer diameter and length of the shaft 1 are not affected even when the damping valve V has a complicated structure. As a result, a required damping characteristic can be realized without increasing the size of the rotary damper D.

Furthermore, the gas chamber G, the liquid chamber L, and the sliding partition wall 32 together constitute the compensation mechanism that compensates for volume variation caused by variation in the temperature of the fluid in the shaft 1. Hence, there is no need to provide the compensation mechanism on the side of the case 4 or in a location that affects the swingable range of the shaft 1, and as a result, the rotary damper D can be reduced in size.

The compensation mechanism is not limited to the configuration described above, and instead of defining the liquid chamber L and the gas chamber G using the sliding partition wall 32, the liquid chamber L and the gas chamber G may be defined by providing a diaphragm or a bladder in the hollow portion 1*a*. Moreover, a gas chamber may be formed and used as the compensation mechanism by housing a diaphragm or a bladder in the interior of the first chamber R1 or the second chamber R2 instead of the hollow portion 1*a*.

Furthermore, the damping valve V is constituted by the partition wall member 33, which is inserted into the hollow portion 1*a* provided in the shaft 1 so as to define within the hollow portion 1*a* the first side valve chamber A that communicates with the first chamber R1 and the second side valve chamber B that communicates with the second chamber R2, the first side port 33*b* and the second side port 33*c*, which are provided in the partition wall member 33 to connect the first side valve chamber A to the second side valve chamber B, the first side leaf valve 34 capable of opening and closing the first side port 33*b*, and the second side leaf valve 35 capable of opening and closing the second side port 33*c*. Hence, a damping force generation source that generates the damping force is switched between the first side leaf valve 34 and the second side leaf valve 35 in accordance with the rotation direction of the shaft 1, and therefore an optimum damping force can be generated in accordance with the rotation direction of the rotary damper D.

The first side valve body and the second side valve body are constituted by the annular leaf valves 34, 35, and the leaf valves 34, 35 are attached to the outer periphery of the rod 36 penetrating the partition wall member 33 so as to be fixed to the partition wall member 33. By assembling the respective members constituting the damping valve V in this manner, an operation to house the damping valve V in the hollow portion 1*a* of the shaft 1 is easy.

Moreover, the rotary damper D includes the partitioning member 37 provided on the base end of the rod 36 and inserted into the hollow portion 1*a* to partition the liquid chamber L from the first side valve chamber A, and the holder member 38 that holds the rod 36 and seals the second side valve chamber B. The holder member 38 includes the annular portion 38*a* attached to the outer periphery of the rod 36, and the fitting portion 38*b* provided on the outer periphery of the annular portion 38*a* and fitted into the hollow portion 1*a*. The step portion 1*h* is provided on the inner periphery of the hollow portion 1*a*. The fitting portion 38*b* is sandwiched between the step portion 1*h* and the outer peripheral screw nut 40 screwed to the inner periphery of the hollow portion 1*a*, whereby the holder member 38 is fixed to the interior of the hollow portion 1*a*. As a result, a load of the outer periphery screw nut 40 pressing the holder member 38 does not act on the rod 36 integrating the partition wall member 33 and the first side leaf valve 34 and second side leaf valve 35 attached thereto. Hence, according to the rotary damper D, a desired damping characteristic can be realized.

In the rotary damper D, the valve nut 39 attached to the tip end of the rod 36 is disposed on an opposite side to the sliding partition wall 32. As a result, interference between the sliding partition wall 32 and the valve nut 39 can be avoided.

The rod 36 is formed in a tubular shape so that the fluid can be injected into the liquid chamber L from the outside of the holder member 38. Hence, according to the rotary damper D, the fluid injection operation is extremely easy.

The hollow portion 1*a* opens onto at least one end of the shaft 1, and this end is covered by the side panel 3 such that the auxiliary liquid chamber Ls is formed between the holder member 38 and the side panel 3 so as to communicate with the liquid chamber L. By having the auxiliary liquid chamber Ls function as a liquid chamber in addition to the liquid chamber L in this manner, a sufficient liquid chamber capacity can be secured. Further, a correspondingly sufficient capacity can be secured in the gas chamber G, enabling a reduction in pressure variation in the gas chamber G due to volume variation in the fluid. Hence, according to the rotary damper D, an amount of variation in the damping characteristic due to temperature variation can be reduced.

The panel side injection port 3*d*, which communicates with the auxiliary liquid chamber Ls and through which the fluid can be injected into the liquid chamber L, is provided in the side panel 3, and the case side injection ports 23, 24, which respectively communicate independently with both the first chamber R1 and the second chamber R2 and through which the fluid can be injected into the case 4, are provided in the case 4. Hence, according to the rotary damper D, the fluid injection operation time can be reduced, and gas retention in the first chamber R1, the second chamber R2, the first side valve chamber A, the second side valve chamber B, the liquid chamber L, and the auxiliary liquid chamber Ls can be prevented reliably.

The shaft 1 is coupled to the suspension interposed between the vehicle body and the axle, and the chamber, from among the first chamber R1 and the second chamber R2, that contracts when the vehicle body and the axle approach each other communicates with the liquid chamber L via the orifice passage 37*b*. Therefore, pressure does not escape into the liquid chamber L from the chamber, among the first chamber R1 and the second chamber R2, which is more likely to increase in pressure. As a result, the rotary damper D can generate an expected damping force, and is optimal for application to a suspension of a vehicle.

It should be noted that in this embodiment, the chamber that contracts when the vehicle body and the axle approach each other is the first chamber R1. Accordingly, the first chamber R1 is connected to the liquid chamber L. However, when the chamber that contracts when the vehicle body and the axle approach each other is the second chamber R2, the second chamber R2 is connected to the liquid chamber L.

According to the embodiment described above, a following effect is obtained.

The rotary damper D generates the damping force for suppressing rotation of the shaft 1 as the shaft 1 rotates. In the rotary damper D, the damping valve V that applies resistance to the flow of the fluid traveling between the first chamber R1 and the second chamber R2 is provided in the shaft 1. Hence, there is no need to provide the damping valve V on the side of the case 4 or in a location that affects the swingable range of the shaft 1. As a result, the rotary damper D can be reduced in size and weight.

Embodiments of this invention were described above, but the above embodiments are merely examples of applications of this invention, and the technical scope of this invention is not limited to the specific constitutions of the above embodiments.

This application claims priority based on Japanese Patent Application No. 2012-047678 filed with the Japan Patent Office on Mar. 5, 2012, the entire contents of which are incorporated into this specification.

The embodiments of this invention in which an exclusive property or privilege is claimed are defined as follows:

1. A rotary damper comprising:
a shaft having a hollow portion and capable of rotating about a central axis;
a pair of side panels that support the shaft rotatably;
a case provided between the pair of side panels such that an operating chamber is defined in an interior thereof;
a vane provided on the shaft such that a tip end thereof slides against an inner periphery of the case and divides the operating chamber into a first chamber and a second chamber; and
a damping valve provided in the shaft to apply resistance to a flow of a fluid traveling between the first chamber and the second chamber, the damping valve including a partition wall member inserted into the hollow portion to define, within the hollow portion, a first side valve chamber that communicates with the first chamber and a second side valve chamber that communicates with the second chamber;

a sliding partition wall that is inserted into the hollow portion to be free to slide and defines a gas chamber and a liquid chamber within the hollow portion;

a rod that penetrates the partition wall member;

a partitioning member provided on a base end of the rod and inserted into the hollow portion so as to partition the liquid chamber from the first side valve chamber;

a holder member that holds the rod and closes the second side valve chamber; and an outer peripheral screw nut that is screwed to an inner periphery of the hollow portion so as to fix the holder member to the hollow portion, wherein:

a step portion is provided on the inner periphery of the hollow portion, the holder member includes an annular portion attached to an outer periphery of the rod, and a fitting portion provided on an outer periphery of the annular portion and fitted to the hollow portion, and the outer peripheral screw nut and the step portion sandwich the fitting portion of the holder member such that the fitting portion is fixed to the hollow portion.

2. The rotary damper as defined in claim 1, wherein the gas chamber, the liquid chamber and the sliding partition wall constitute a compensation mechanism that is configured to compensate for volume variation caused by variation in a temperature of the fluid.

3. The rotary damper as defined in claim 1, wherein the damping valve further includes:

a first side port and a second side port provided in the partition wall member to connect the first side valve chamber and the second side valve chamber;

a first side valve body capable of opening and closing the first side port; and a second side valve body capable of opening and closing the second side port.

4. The rotary damper as defined in claim 3, wherein the first side valve body and the second side valve body are annular leaf valves that are attached to an outer periphery of the rod and fitted to the partition wall member.

5. The rotary damper as defined in claim 1, wherein the liquid chamber communicates with one of the first side valve chamber and the second side valve chamber.

6. The rotary damper as defined in claim 1, wherein the rod is formed in a tubular shape so that the fluid can be injected into the liquid chamber from outside the holder member.

7. The rotary damper as defined in claim 1, wherein the hollow portion opens onto at least one end of the shaft, and one of the side panels covers the end of the shaft so as to form, together with the holder member, an auxiliary liquid chamber that communicates with the liquid chamber.

8. The rotary damper as defined in claim 7, wherein one of the side panels includes a panel side injection port which communicates with the auxiliary liquid chamber and through which the fluid can be injected into the liquid chamber, and the case includes case side injection ports which respectively communicate independently with one or both of the first chamber and the second chamber and through which the fluid can be injected into the case.

9. The rotary damper as defined in claim 1, wherein the shaft is coupled to a suspension interposed between a vehicle body and an axle of a vehicle, and a chamber, from among the first chamber and the second chamber, that contracts when the vehicle body and the axle of the vehicle approach each other communicates with the liquid chamber via an orifice passage.

* * * * *